United States Patent
Tokunaga

(10) Patent No.: US 10,998,555 B2
(45) Date of Patent: May 4, 2021

(54) ELECTRODE JOINING METHOD AND ELECTRODE JOINING APPARATUS

(71) Applicant: HONDA MOTOR CO., LTD., Tokyo (JP)

(72) Inventor: Yoshinori Tokunaga, Tochigi (JP)

(73) Assignee: HONDA MOTOR CO., LTD., Tokyo (JP)

(*) Notice: Subject to any disclaimer, the term of this patent is extended or adjusted under 35 U.S.C. 154(b) by 146 days.

(21) Appl. No.: 16/220,131

(22) Filed: Dec. 14, 2018

(65) Prior Publication Data

US 2019/0190032 A1 Jun. 20, 2019

(30) Foreign Application Priority Data

Dec. 15, 2017 (JP) .............................. JP2017-241019

(51) Int. Cl.
*H01M 4/88* (2006.01)
*H01M 8/1004* (2016.01)
*H01M 8/1018* (2016.01)

(52) U.S. Cl.
CPC ......... *H01M 4/881* (2013.01); *H01M 4/8828* (2013.01); *H01M 8/1004* (2013.01); *H01M 8/1018* (2013.01); *H01M 4/8875* (2013.01); *H01M 4/8878* (2013.01); *H01M 2008/1095* (2013.01)

(58) Field of Classification Search
CPC .. H01M 4/881; H01M 4/8828; H01M 4/8875; H01M 4/8878; H01M 8/1001; H01M 8/1018; H01M 2008/1095
USPC ....................................................... 429/483
See application file for complete search history.

(56) References Cited

U.S. PATENT DOCUMENTS

| | | | | |
|---|---|---|---|---|
| 6,823,584 | B2 * | 11/2004 | Schaefer | B30B 5/06 29/825 |
| 7,740,728 | B2 * | 6/2010 | Ametani | H01L 21/67132 156/228 |
| 9,216,861 | B2 * | 12/2015 | Adachi | B65H 23/0326 |
| 2004/0209138 | A1 * | 10/2004 | Ueyama | H01M 4/926 429/535 |
| 2006/0166077 | A1 * | 7/2006 | Lee | H01M 4/8825 429/430 |
| 2006/0208384 | A1 * | 9/2006 | Mnatsakanyan | H01B 1/24 264/105 |

(Continued)

FOREIGN PATENT DOCUMENTS

JP 08050900 A * 2/1996
JP 2008258097 A * 10/2008

(Continued)

*Primary Examiner* — Milton I Cano
*Assistant Examiner* — Suphia Quraishi
(74) *Attorney, Agent, or Firm* — Rankin, Hill & Clark LLP

(57) ABSTRACT

An electrode joining method includes: an electrode sheet conveying step of conveying the cathode electrode sheet of a size enabling a plurality of cathode electrode layers to be acquired; an anomaly detecting step of detecting anomalies in the cathode electrode sheet; a specifying step of specifying a predetermined shape from an area excluding a location having an anomaly that was detected in the anomaly detecting step; a cutting step of cutting out the cathode electrode layer of the predetermined shape specified in the specifying step; and a step of joining the cathode electrode layer of the predetermined shape that was cut out to the PEM.

8 Claims, 5 Drawing Sheets

(56) References Cited

U.S. PATENT DOCUMENTS

| | | | |
|---|---|---|---|
| 2006/0216563 A1* | 9/2006 | Matsunaga | H01M 4/8807 429/483 |
| 2010/0221635 A1* | 9/2010 | Yamada | H01M 4/8657 429/480 |
| 2011/0039017 A1* | 2/2011 | Okazaki | C23C 14/562 427/8 |
| 2011/0122991 A1* | 5/2011 | Ahn | G01N 23/046 378/10 |
| 2012/0244457 A1* | 9/2012 | Kwon | H01M 4/8807 429/532 |
| 2012/0279648 A1* | 11/2012 | Hou | H01M 4/8882 156/280 |
| 2013/0306237 A1* | 11/2013 | Nagasaka | H01M 8/0271 156/285 |
| 2014/0017579 A1* | 1/2014 | Hata | C04B 35/6261 429/408 |
| 2014/0093813 A1* | 4/2014 | Kozal | H01M 8/0258 429/535 |
| 2014/0119499 A1* | 5/2014 | Ahn | G01N 23/046 378/10 |
| 2014/0272507 A1* | 9/2014 | Ku | H01M 10/0431 429/94 |
| 2014/0272543 A1* | 9/2014 | Devan | H01M 50/431 429/162 |
| 2015/0180044 A1* | 6/2015 | Vincent | B32B 37/24 156/247 |
| 2015/0200401 A1* | 7/2015 | Vandenborre | H01M 4/8875 429/422 |
| 2016/0268617 A1 | 9/2016 | Shibutani et al. | |
| 2016/0372783 A1* | 12/2016 | Min | H01M 10/0413 |
| 2017/0084895 A1* | 3/2017 | Wang | B26D 5/007 |
| 2017/0252863 A1* | 9/2017 | Hwang | B23K 26/38 |
| 2017/0307542 A1* | 10/2017 | Watanabe | B65H 18/08 |
| 2018/0026273 A1* | 1/2018 | Okonogi | B05B 5/025 156/98 |
| 2018/0226657 A1* | 8/2018 | Mukasa | B26D 7/1863 |
| 2019/0006682 A1* | 1/2019 | Okano | H01M 4/8605 |
| 2019/0027760 A1* | 1/2019 | Kishi | H01M 4/8828 |
| 2019/0101474 A1* | 4/2019 | Fujii | F01N 3/105 |
| 2019/0190032 A1* | 6/2019 | Tokunaga | H01M 4/8828 |
| 2020/0036002 A1* | 1/2020 | Chakraborty | H01M 4/364 |
| 2020/0139569 A1* | 5/2020 | Wi | H01M 10/04 |
| 2020/0235433 A1* | 7/2020 | Kim | H01M 50/409 |

FOREIGN PATENT DOCUMENTS

| | | | |
|---|---|---|---|
| JP | 2013036768 A * | 2/2013 | |
| JP | 2014201053 A * | 10/2014 | |
| JP | 2015015226 A * | 1/2015 | |
| JP | 2015149201 A * | 8/2015 | |
| JP | 2015207440 A * | 11/2015 | |
| JP | 2016-167433 | 9/2016 | |
| JP | 2017142890 A * | 8/2017 | |
| WO | WO-2017037929 A1 * | 3/2017 | H01M 4/861 |
| WO | WO-2017158895 A1 * | 9/2017 | B05C 11/00 |

\* cited by examiner

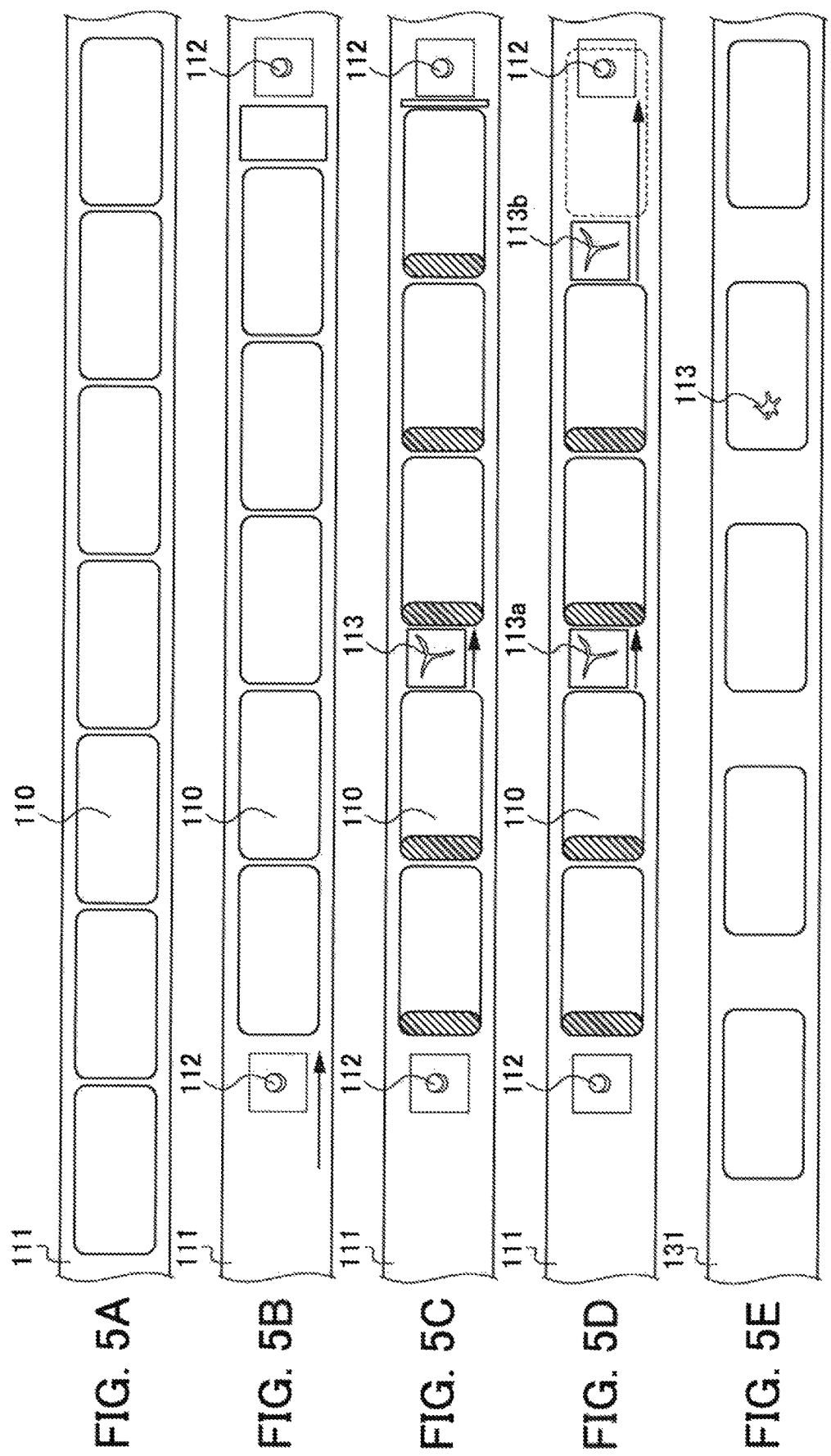

ELECTRODE JOINING METHOD AND ELECTRODE JOINING APPARATUS

This application is based on and claims the benefit of priority from Japanese Patent Application No. 2017-241019, filed on 15 Dec. 2017, the content of which is incorporated herein by reference.

BACKGROUND OF THE INVENTION

Field of the Invention

The present invention relates to an electrode joining method for fuel cells and an electrode joining apparatus for fuel cells.

Related Art

Engines with gasoline or the like as fuel, a motor driven by electricity, and devices combining an engine and a motor have been implemented as the source of power of a vehicle. From the point of environmental concern in recent years, fuel cell vehicles which drive a motor by electricity generated by a fuel cell have been of focus. The fuel cell supplies air and hydrogen to an electrode assembly configured by an anode electrode and cathode electrode sandwiching an electrolyte film, and generates electrical energy and water.

As a method of continuously producing an electrode assembly to be employed in such fuel cells, technology has been proposed that produces an electrode assembly by cutting out an electrode layer in a predetermined shape, and bonding to the electrolyte film (for example, refer to Patent Document 1).

Patent Document 1: Japanese Unexamined Patent Application, Publication No. 2016-167433

SUMMARY OF THE INVENTION

However, in the course of producing the electrode layer, cracking may be introduced and holes may appear in the electrode layer. When cracking or holes are included in the electrode layer after cutting, since there is a possibility of the quality of the electrode layer becoming unacceptable, an improvement in yield percentage has been demanded.

The present invention has an object of providing an electrode joining method and electrode joining apparatus for which yield percentage is improved.

A first aspect of the present invention relates to an electrode joining method for an electrode assembly of a fuel cell including a pair of electrode layers and an electrolyte layer, the method including the steps of: conveying an electrode sheet of a size enabling a plurality of sheets of at least one electrode layer among the pair of electrode layers to be acquired; detecting an anomaly in the electrode sheet; specifying a predetermined shape from an area excluding a location having an anomaly detected in the detecting step; cutting out the electrode layer of the predetermined shape specified in the specifying step; and joining the electrode layer of the predetermined shape that was cut out to the electrolyte layer.

According to a second aspect of the present invention, in the electrode joining method as described in the first aspect, the anomaly detecting step may include: a first detecting step of detecting an anomaly in the entire surface of the electrode sheet; and a second detecting step of detecting an anomaly in part of an area excluding a location having an anomaly in the first detecting step.

According to a third aspect of the present invention, in the electrode joining method as described in the first aspect, the anomaly detecting step may include: a first detecting step of detecting a surface irregularity in the electrode sheet; and a second detecting step of detecting a hole in the electrode sheet in an area excluding a location having a surface irregularity that was detected in the first detecting step.

According to a fourth aspect of the present invention, in the electrode joining method as described in the third aspect, the second detecting step may detect an anomaly in only an end of a portion to be cut out as an electrode layer of the electrode sheet.

According to a fifth aspect of the present invention, in the electrode joining method as described in any one of the second to fourth aspects, detection precision may be set to be higher in the second detecting step than in the first detecting step.

A sixth aspect of the present invention relates to an electrode joining apparatus for an electrode assembly of a fuel cell including a pair of electrode layers and an electrolyte layer, the electrode joining apparatus including: a conveying device which conveys an electrode sheet of a size enabling a plurality of sheets of at least one electrode layer among the pair of electrode layers to be acquired; an anomaly detection device which detects an anomaly in the electrode sheet; a cutting device which cuts out an electrode layer of a predetermined shape from an area of the electrode sheet excluding a location having an anomaly that was detected by the anomaly detection device; and a joining device which joins the electrode layer of predetermined shape to the electrolyte layer.

According to a seventh aspect of the present invention, in the electrode joining apparatus as described in the sixth aspect, the anomaly detection device may include: a first detection device which detects a surface irregularity in the electrode sheet; and a second detection device which detects a hole in the electrode sheet in an area excluding a location having a surface irregularity that was detected by the first detection device.

According to an eighth aspect of the present invention, in the electrode joining apparatus as described in the seventh aspect, the second detection device may detect an anomaly by moving in a direction orthogonal to a conveying direction of the electrode sheet.

In the first aspect of the present invention, the electrode joining method of the present embodiment includes: an electrode sheet conveying step of conveying an electrode sheet of a size enabling a plurality of sheets of at least one electrode layer among a pair of electrode layers to be acquired; an anomaly detecting step of detecting anomalies in the electrode sheet; a specifying step of specifying a predetermined shape from an area excluding a location having the anomaly detected in the anomaly detecting step; a cutting step of cutting out the electrode layer of the predetermined shape that was specified in the specifying step; and a joining step of joining the electrode layer of the predetermined shape that was cut out to the electrolyte layer. For this reason, it is possible to suppress anomalies from being detected in the electrode layer of predetermined shape that was cut out. It is thereby possible to provide an electrode joining method having improved yield rate.

According to the second aspect, in the electrode joining method as described in the first aspect, the anomaly detecting step includes: a first detecting step of detecting anomalies in the entire surface of the cathode electrode sheet 111; and a second detecting step of detecting anomalies in part of an area excluding a location having the anomaly in the first detecting step. For this reason, there is no longer overlapping of the area in which detecting an anomaly in the first detecting step, and area in which detecting an anomaly by way of the second detecting step. It is thereby possible to efficiently detect anomalies of the electrode sheet.

According to the third aspect, in the electrode joining method as described in the first aspect, the anomaly detecting step has a first detecting step of detecting a surface irregularity in the electrode sheet, and a second detecting step of detecting a hole in the electrode sheet in an area excluding the location having the surface irregularity that was detected in the first detecting step. For this reason, there is no longer overlap between the area in which detecting the surface irregularity in the first detecting step, and the area in which detecting the hole by the second detecting step. It is thereby possible to efficiently detect surface irregularities and holes in the electrode sheet.

According to the fourth aspect, in the electrode joining method as described in the third aspect, the second detecting step detects anomalies only at an end of the portion to be cut out as the electrode layer of the electrode sheet. For this reason, it is possible to avoid anomalies being detected at the end of the portion to be cut out as the electrode layer of the electrode sheet. It is thereby possible to both efficiently detect anomalies, and possible to sufficiently improve the yield rate.

According to the fifth aspect, in the electrode joining method as described in any one of the second to fourth aspects, the second detecting step is set to higher detection precision than the first detecting step. It is thereby possible to more efficiently detect anomalies in the electrode sheet.

In the sixth aspect of the present invention, the electrode joining apparatus includes: the first conveying device which conveys an electrode sheet of a size enabling a plurality of sheets of at least one electrode layer among the pair of electrode layers to be acquired; the anomaly detection device which detects an anomaly in the electrode sheet; the first cutting device which cuts out the electrode layer of a predetermined shape from an area excluding a location having an anomaly detected by the anomaly detection device in the electrode sheet; and the joining device which joins the electrode layer of predetermined shape to the electrolyte layer. For this reason, it is possible to suppress anomalies from being detected in the electrode layer of predetermined shape that was cut out. It is thereby possible to provide an electrode joining apparatus of improved yield rate.

According to the seventh aspect, in the electrode joining apparatus of the sixth aspect, the anomaly detection device includes the first detection device which detects surface irregularities in the electrode sheet; and the second detection device which detects holes in the electrode sheet in the area excluding locations having surface irregularities detected by the first detection device. For this reason, there will no longer be overlapping of an area in which detecting surface irregularities in the first detection device and an area in which detecting holes according to the second detection device. It is thereby possible to efficiently detect surface irregularities and holes in the electrode sheet.

According to the eighth aspect, in the electrode joining apparatus as described in the seventh aspect, the second detection device detects anomalies by moving in a direction which is orthogonal to the conveying direction of the electrode sheet. For this reason, anomalies holes which are in an area that cannot be detected in the case of fixing the second detection device are detected. It is thereby possible to efficiently detect anomalies in the electrode sheet by the second detection device.

BRIEF DESCRIPTION OF THE DRAWINGS

FIGS. 5A to 5E are schematic views for explaining an anomaly detection device (anomaly detecting step) according to the present embodiment.

DETAILED DESCRIPTION OF THE INVENTION

Figure 1:
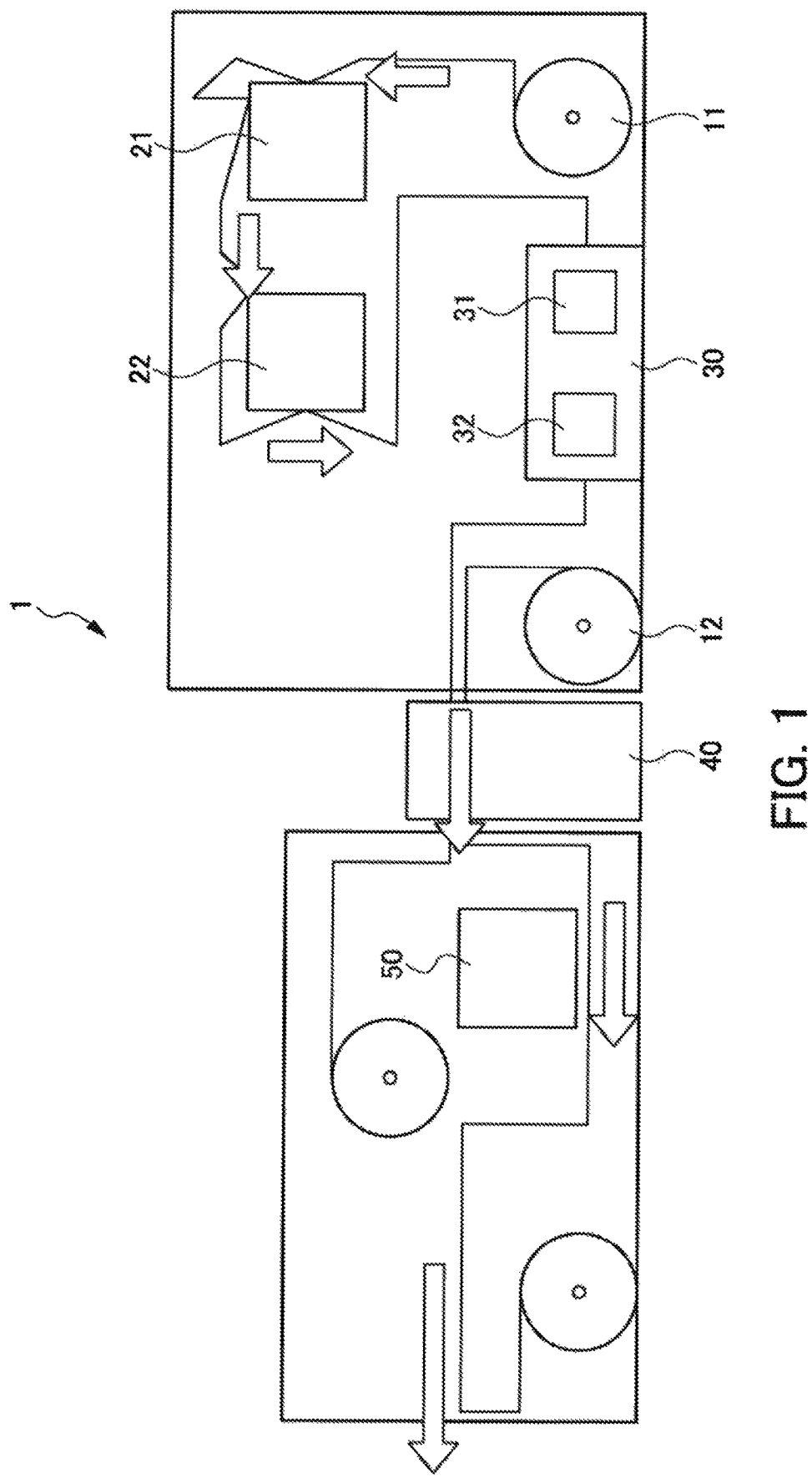
FIG. 1 is an overall block diagram of an electrode bonding apparatus according to the present embodiment.
Figure 2:
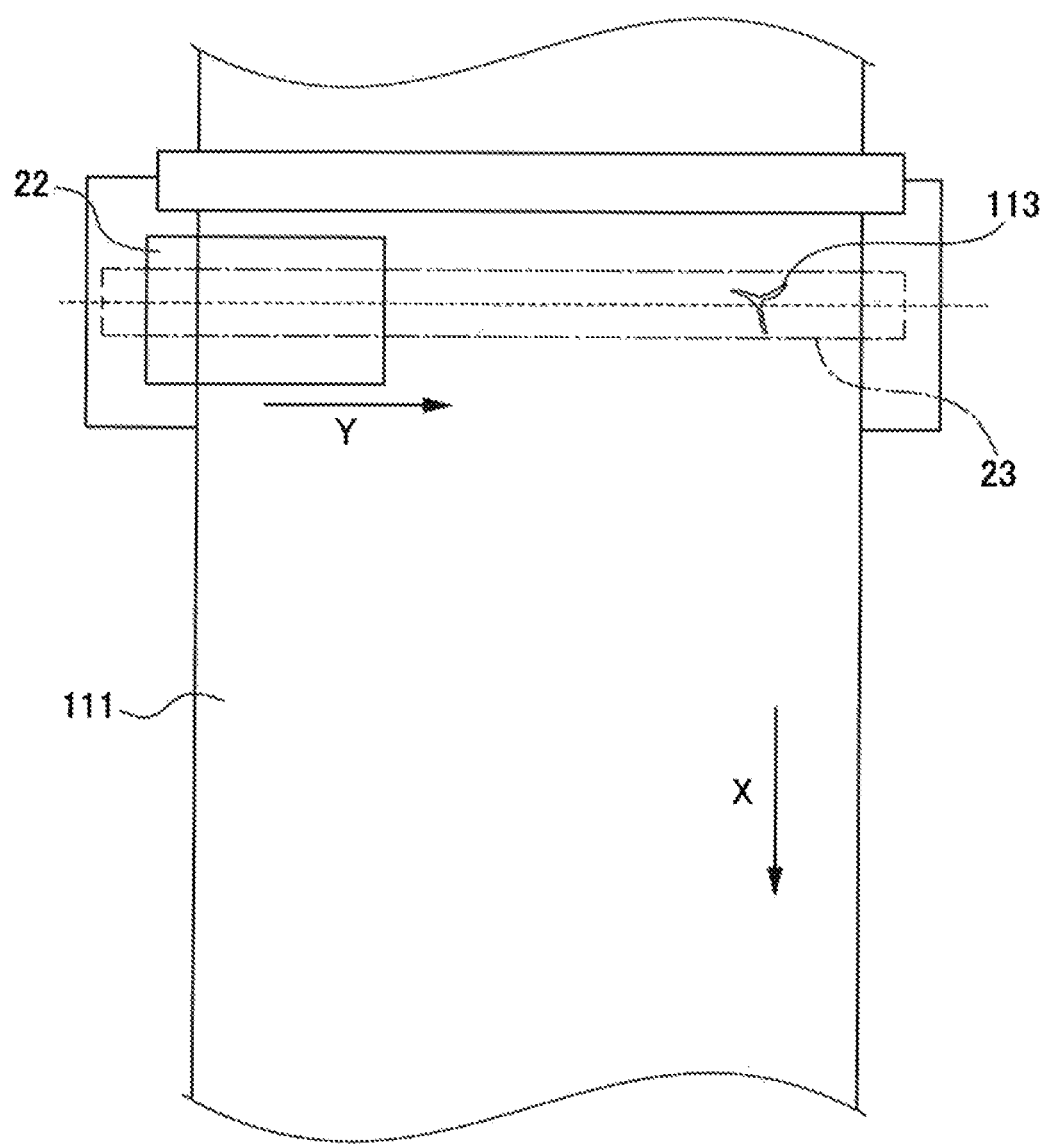
FIG. 2 is a schematic view for explaining a second detection device of the electrode bonding apparatus according to the present embodiment.

Hereinafter, an electrode bonding apparatus according to an embodiment of the present invention will be explained in detail while referencing the drawings. FIG. 1 is an overall block diagram of an electrode bonding apparatus according to the present embodiment, and FIG. 2 is a schematic view for explaining a second detection device of the electrode bonding apparatus according to the present embodiment.

The electrode bonding apparatus 1 is a device that produces an electrode assembly 100 (membrane electrode assembly) of a fuel cell including a pair of electrode layers consisting of a cathode electrode layer 110 and anode electrode layer 120, and a PEM (solid polymer electrolyte membrane) serving as the electrolyte layer.

As shown in FIG. 1, the electrode bonding apparatus 1 includes: a first conveying device 11, a second conveying device 12, a first detection device 21 and second detection device 22 serving as anomaly detection devices, a first cutting device 30, and a bonding device 40.

The first conveying device 11 is a device which conveys an electrode sheet of a size enabling a plurality of sheets of at least one electrode layer among the pair of electrode layers to be obtained. In the present embodiment, the first conveying device 11 is a device which conveys a cathode electrode sheet 111 of a size enabling a plurality of sheets of the cathode electrode layer 110 to be obtained. The first conveying device 11 conveys the cathode electrode sheet 111 in the order of the first detection device 21, second detection device 22, first cutting device 30 and bonding device 40.

The second conveying device 12 is a device which conveys a PEM sheet 131 of a size enabling a plurality of sheets of the PEM to be obtained. The second conveying device 12 conveys the PEM sheet 131 to the bonding device 40.

The first detection device 21 and second detection device 22 are devices which detect anomalies in the cathode electrode sheet 111. In the present embodiment, the first detection device 21 is a device which detects surface irregularities 112 in the cathode electrode 111, and the second detection device 22 is a device which detects a hole 113 in the cathode electrode sheet 111 in an area excluding the location having a surface irregularities detected in the first detecting step. The first detection device 21, second detection device 22, and a specified unit 31 of the first cutting device 30 described later are connected electrically.

In addition, in the present embodiment, the detection precision of the second detection device 22 is set to be higher than the detection precision of the first detection device 21. For this reason, it is possible to detect a hole 113 with high precision in the area excluding a location having surface irregularities 112. It is thereby possible to more efficiently detect anomalies (surface irregularity 112, hole 113) in the cathode electrode sheet 111.

In addition, in the present embodiment, the second detection device 22 detects anomalies not in the entire surface of the cathode electrode sheet 111, but rather only at the end of a portion to be cut out as the cathode electrode layer 110 of the cathode electrode sheet 111.

In addition, in the present embodiment, the second detection device 22 detects an anomaly (hole 113) by moving in a direction orthogonal to the conveying direction X of the cathode electrode sheet 111 (refer to FIG. 2). In other words, a self-traveling direction Y of the second detection device 22 is orthogonal to the conveying direction X; therefore, the detection area 23 of the second detection device 22 spreads out in an area not reached in the case of fixing the second detection device 22. For this reason, a hole 113 that would be in an undetectable area in the case of fixing the second detection device 22 is detected. It is thereby possible to more efficiently detect anomalies in the cathode electrode sheet 111 by the second detection device 22.

The first cutting device 30 is a device which cuts out the cathode electrode layer 110 of a predetermined shape from an area excluding a location having an anomaly (irregular surface 112, hole 113) detected by an anomaly detection device (first detection device 21 and second detection device 22). In the present embodiment, the first cutting device 30 includes the specification unit 31 and a cutting unit 32. The specification unit 31 is electrically connected with the anomaly detection device (first detection device 21 and second detection device 22), and specifies a predetermined shape from an area excluding the location having an anomaly detected by the anomaly detection device (refer to FIG. 2). In addition, the cutting unit 32 cuts out (half cuts) the cathode electrode layer 110 of the predetermined shape specified by the specification unit 31.

The bonding device 40 is a device which bonds the cathode electrode layer 110 of predetermined shape to the PEM. In the present embodiment, the bonding device 40 bonds the cathode electrode layer 110 of predetermined shape to the PEM so that the cathode electrode layer 110 that was cut out in the predetermined shape from the substrate of cathode electrode sheet 111 is heat transfer printed on the PEM sheet 131.

The electrode bonding apparatus 1 may further include an anomaly detection device 50, second cutting device (not illustrated), peeling device (not illustrated), and CP bonding device (not illustrated).

The anomaly detection device 50 is a device which detects an anomaly (for example, the hole 113) in the PEM sheet 131 to which the cathode electrode layer 110 was bonded. In the case of the anomaly detection device 50 having detected the hole 113, it is no longer necessary to perform later steps on the PEM sheet 131 to which the cathode electrode layer 110 having the hole 113 was bonded. It is thereby possible to efficiently produce the electrode assembly 100. The second cutting device is a device which cuts out (half cuts) the PEM to which the cathode electrode layer 110 was bonded. The peeling device is a device which peels the PEM to which the cathode electrode layer 110 was bonded, from the substrate of the PEM sheet 131. The CP bonding device is a device that bonds anode carbon paper of the anode electrode layer 120 to a surface on the PEM side of the PEM to which the cathode electrode layer 110 was bonded, and bonds the cathode carbon paper of the cathode electrode layer 110 to a surface on the cathode electrode layer 110 side of the PEM to which the cathode electrode layer 110 was bonded. In the above way, it is possible to obtain the electrode assembly 100 in which the pair of electrode layers and the PEM were integrated by the electrode bonding apparatus 1.

Figure 3:
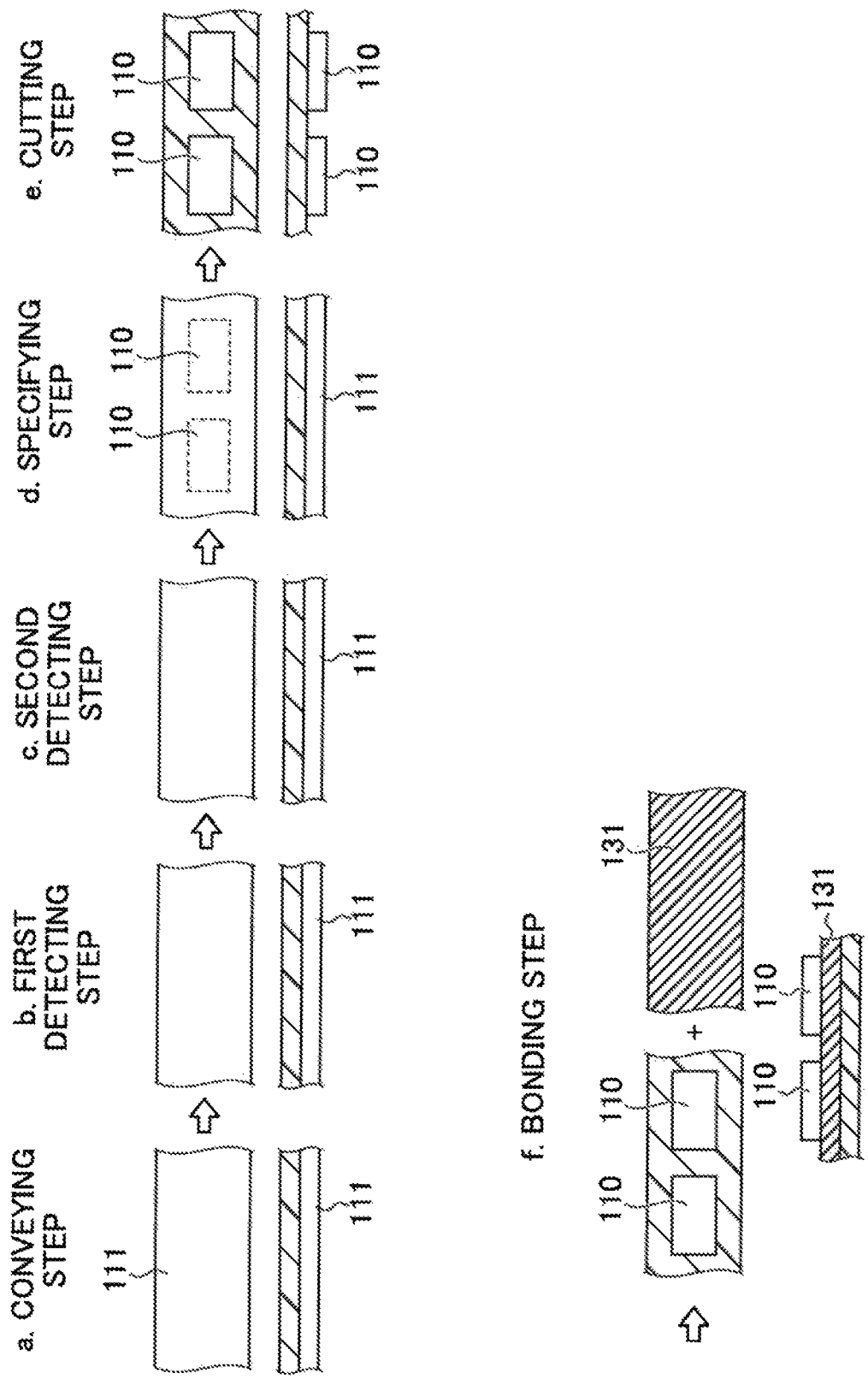
FIG. 3 is a schematic view showing each step of an electrode bonding method according to the present embodiment.

Next, an electrode bonding method according to an embodiment of the present invention will be explained in detail while referencing the drawings. FIG. 3 is a schematic view showing the respective steps of the electrode bonding method according to the present embodiment.

The production method of the electrode assembly 100 is a method of producing the electrode assembly 100 of a fuel cell including a pair of electrode layers consisting of the cathode electrode layer 110 and anode electrode layer 120; and the PEM (solid polymer electrolyte membrane) serving as the electrolyte layer.

The production method of the electrode assembly 100 includes a conveying step, first anomaly detecting step, first cutting step, and bonding step.

As shown in FIG. 3, a. CONVEYING STEP is a step of conveying an electrode sheet of a size enabling a plurality of sheets of at least one electrode layer among the pair of electrode layers to be acquired. In the present embodiment, the conveying step is a step of conveying the cathode electrode sheet 111 of a size enabling a plurality of sheets of the cathode electrode layer 110 to be acquired. For example, the conveying step includes a step of putting the cathode electrode sheet 111 on the above-mentioned first conveying device 11, and includes a step of putting the PEM sheet 131 on the above-mentioned second conveying device 12.

The first anomaly detecting step is a step of detecting an anomaly in the cathode electrode sheet 111. In the present embodiment, it has a first detecting step of detecting an anomaly on the entire surface of the cathode electrode sheet 111 by the above-mentioned first detection device 21, and a second detecting step of detecting by the above-mentioned second detection device 22 an anomaly in part of an area excluding the location having the anomaly in the first detecting step.

As shown in FIG. 3, b. FIRST DETECTING STEP is a step of detecting a surface irregularity 112 in the cathode electrode sheet 111. As shown in FIG. 3, c. SECOND DETECTING STEP is a step of detecting a hole 113 in the cathode electrode sheet 111 in an area excluding the location having the surface irregularity detected in the first detecting step.

In addition, in the present embodiment, the detection precision of the second detecting step (second detection device 22) is set to be higher than the detection precision of the first detecting step (first detection device 21). For this reason, in the area excluding the location having the surface irregularity 112, it is possible to detect the hole 113 with high precision. It is thereby possible to efficiently detect anomalies (surface irregularity 112, hole 113) in the cathode electrode sheet 111.

In addition, in the present embodiment, the second detection device 22 operates in the second detecting step so as to detect anomalies only in the end of the portion to be cut out as the cathode electrode layer 110 of the cathode electrode sheet 111, rather than the entire surface of the cathode electrode sheet 111 (described later).

In addition, in the present embodiment, the second detection device 22 operates in the second detecting step so as to detect anomalies (hole 113) by moving in a direction (self-traveling direction Y) orthogonal to the conveying direction of the cathode electrode sheet 111 (refer to FIG. 2). It is thereby possible to efficiently detect anomalies in the cathode electrode sheet 111 by the second detection device 22.

The first cutting step is a step of cutting out the cathode electrode layer 110 in a predetermined shape from the area excluding the location having an anomaly (surface irregularity 112, hole 113) detected in the anomaly detecting step (first detecting step and second detecting step). In the present embodiment, the first cutting step includes a specifying step and cutting step.

As shown in FIG. 3, d. SPECIFYING STEP is a step of specifying the predetermined shape from the area excluding the location having the anomaly detected in the anomaly detecting step. In addition, as shown in FIG. 3, e. CUTTING STEP is a step of cutting out (half cutting) the cathode electrode layer 110 of a predetermined shape specified by the specification unit 31.

As shown in FIG. 3, f. BONDING STEP is a step of bonding the cathode electrode layer 110 of predetermined shape to the PEM. In the present embodiment, the bonding step is a step of bonding the cathode electrode layer 110 of predetermined shape to the PEM, so that the cathode electrode layer 110 cut out in the predetermined shape from the substrate of the cathode electrode sheet 111 is heat transfer printed on the PEM sheet 131.

The production method of the electrode assembly 100 may further include a second anomaly detecting step, a second cutting step, a peeling step and a CP bonding step.

The second anomaly detecting step is a step of detecting anomalies (for example, the hole 113) in the PEM sheet 131 to which the cathode electrode layer 110 was bonded. In the case of the hole 113 being detected in the second anomaly detecting step, it is no longer necessary to perform subsequent steps on the PEM sheet 131 to which the cathode electrode layer 110 having the hole 113 was bonded. It is thereby possible to efficiently produce the electrode assembly 100. The second cutting step is a step of cutting out (half cutting) the PEM to which the cathode electrode layer 110 of a predetermined shape was bonded. The peeling step is a step of peeling the PEM to which the cathode electrode layer 110 was bonded from the substrate of PEM sheet 131. The CP bonding step is a step of bonding the anode carbon paper of the anode electrode layer 120 to the surface on the PEM side of the PEM to which the cathode electrode layer 110 was bonded, and bonding the cathode carbon paper of the cathode electrode layer 110 to the surface on the cathode electrode layer 110 side of the PEM to which the cathode electrode layer 110 was bonded. As mentioned above, it is possible to obtain the electrode assembly 100 in which the pair of electrode layers and the PEM are integrated, by the production method of the electrode assembly 100.

Figure 4:
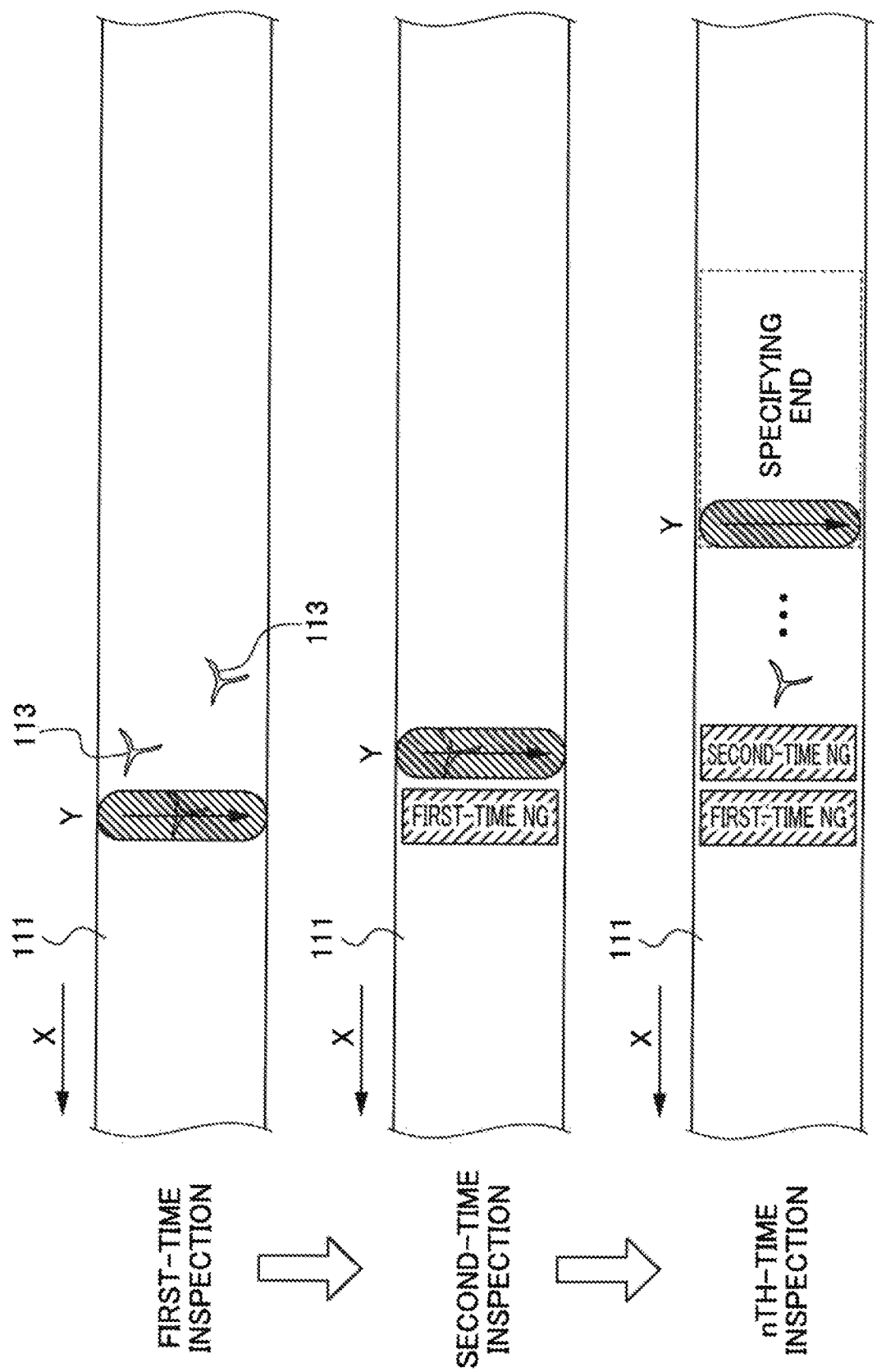
FIG. 4 is a schematic view showing an example of an anomaly detection method by a second detection device (second detecting step) according to the present embodiment.

Next, it will be explained in detail using FIG. 4 how the cutting position of the cathode electrode layer 110 is specified by the specification unit 31 (specifying step), in the case of an anomaly (hole 113) being detected by the second detection device 22 (second detecting step). FIG. 4 is a schematic view showing an example of an anomaly detection method by the second detection device (second detecting step) according to the present embodiment.

As mentioned above, in the present embodiment, the second detection device 22 detects an anomaly not in the entire surface of the cathode electrode sheet 111, but rather only the end of the portion to be cut out as the cathode electrode layer 110 of the cathode electrode sheet 111. For example, the second detection device 22 performs first-time inspection (detection of anomalies) of whether or not there is a hole 113 in the self-traveling direction Y in a region excluding the surface irregularity 112 of the cathode electrode sheet 111. In the case of the hole 113 not being detected in the first-time inspection, the specification unit 31 specifies the shape of the cathode electrode layer 110 so that the first-time inspection region (region in which hole 113 was not detected) becomes the end of the cathode electrode layer 110.

In the case of the hole 113 being detected in the first-time inspection, the second detection device 22 shifts the cathode electrode layer 110 towards the conveying direction X and performs a second-time re-inspection of whether or not there is the hole 113 towards the self-traveling direction Y. In the case of the hole 113 not being detected in the second-time re-inspection, the specification unit 31 specifies the shape of the cathode electrode layer 110 so that the second-time re-inspection region (region in which hole 113 was not detected) becomes the end of the cathode electrode layer 110.

The inspection is repeated n-times until the hole 113 is no longer detected in the self-traveling direction Y. If the hole 113 is not detected in the n-times inspection, the specification unit 31 specifies the shape of the cathode electrode layer 110 so that the n-time inspection region (region in which hole 113 was not detected) becomes the end of the cathode electrode layer 110.

In such an anomaly detection method by the second detection device 22 (second detecting step), it is possible to avoid the anomaly being detected at the end of the portion to be cut out as the cathode electrode layer 110 of the cathode electrode sheet 111. On the other hand, it is not possible to cut out the cathode electrode layer 110 by reliably avoiding the hole 113 with such an anomaly detection method by way of the second detection device (second detecting step) (also possibility of there being the hole 113 at a location other than the end). However, although the location at which the anomaly (surface irregularity 112) was detected by the first detection device (first detecting step) is excluded, the efficiency of confirming that there is no hole 113 in the entirety of the cathode electrode sheet 11 from before cutting is poor. In addition, even if it is possible to detect the hole 113 at a location other than the end, since the cathode electrode layer 110 is not cut out so as to include this hole 113, even if confirming whether there is the hole 113 at a location other than the end, it is difficult to link to an improvement in yield rate. Therefore, if it is possible to detect the anomaly only of the end of the portion to cut out as the cathode electrode layer 110 of the cathode electrode sheet 111 by the second detection device (second detecting step), it will be both possible to efficiently detect anomalies, and possible to sufficiently improve the yield rate.

Next, the anomaly detection device (anomaly detecting step) will be explained in further detail using FIG. 5. FIG. 5 is a schematic view for explaining the anomaly detection device (anomaly detecting step) according to the present embodiment. In detail, FIGS. 5A to 5D are schematic views for explaining the first detection device 21 and second detection device 22 (first anomaly detecting step) prior to the bonding step, and FIG. 5E is a schematic view for explaining the anomaly detection device (second anomaly detecting step) after the bonding step.

As shown in FIG. 5A, in the case of there not being an anomaly (surface irregularity 112, hole 113) in the cathode electrode sheet 111, the number of sheets (7 sheets in FIG. 5A) of the cathode electrode layer 110 capable of being acquired from the cathode electrode sheet 111 is obtained according to the effective length of the cathode electrode sheet 111.

As shown in FIG. 5B, in the case of two surface irregularities 112 being detected by the first detection device 21, five sheets of the cathode electrode layer 110 are acquired by specifying the predetermined shape from the area excluding the NG region (surface irregularity 112). Since five sheets of the cathode electrode layer 110 are acquired from the cathode electrode sheet 111 which enables a maximum of 7 sheets of cathode electrode layer 110 to be acquired, the yield rate becomes 5/7 in this case.

On the other hand, in the case of not performing detection of surface irregularity 112, since it can be considered that one NG region (surface irregularity 112) extends to two sheets of cathode electrode layer 110, two sheets of the cathode electrode layer 110 for the one NG region will come to include the NG region at most. For this reason, it is found that the yield rate improves on the order of 2/7 at maximum, by the first detection device 21 (first detecting step) according to the present embodiment.

In the case of two surface irregularities 112 being detected by the first detection device 21 as shown in FIG. 5C, in the area excluding the NG region (surface regularity 112), the second detection device 22 detects an anomaly of only the end of the portion to be cut as the cathode electrode layer 110 of the cathode electrode sheet 111. In FIG. 5C, since one hole 113 is detected, five of the cathode electrode layers 110 are acquired by specifying the predetermined shape from the area excluding the NG region (surface irregularity 112, hole 113).

On the other hand, it can be considered that one sheet of the cathode electrode layer 110 includes the NG region (hole 113) in the case of not performing detection of the hole 113. For this reason, it is found that the yield rate improves on the order of 1/5 by the second detection device 22 (second detecting step) according to the present embodiment.

As shown in FIG. 5D, in the case of two surface irregularities 112 being detected by the first detection device 21, in the area excluding the NG region (surface irregularity 112), the second detection device 22 detects the anomaly of only the end of the portion to be cut out as the cathode electrode layer 110 of the cathode electrode sheet 111. In FIG. 5D, the hole 113a is detected at the same location as FIG. 5C, and further, the hole 113b is detected subsequently. The cathode electrode layer 110 of predetermined shape is not cut out from between the hole 113b and surface irregularity 112. Therefore, four of the cathode electrode layers 110 are acquired by specifying the predetermined shape from the area excluding the NG region (surface irregularity 112, hole 113).

On the other hand, it can be considered that two of the cathode electrode layers 110 include the NG region (hole 113) in the case of not performing detection of the hole 113. For this reason, it is found that the yield rate improves on the order of 1/5 by the second detection device 22 (second detecting step) according to the present embodiment.

Even if performing the second detecting step according to the present embodiment, since there is a possibility of there being the hole 113 at a location other than the end, there may be a case of the hole 113 being detected in the cathode electrode layer 110 on the PEM sheet 131 by the anomaly detection device 50 (second anomaly detecting step) as shown in FIG. 5E. So long as it is possible to detect the hole 113 by the anomaly detection device 50 (second anomaly detecting step), it will no longer be necessary to perform subsequent steps on the PEM 131 to which the cathode electrode layer 110 having the hole 113 was bonded. It is thereby possible to efficiently produce the electrode assembly 100.

According to the electrode bonding method of the present embodiment, the following effects are exerted.

(1) The electrode bonding method of the present embodiment includes: an electrode sheet conveying step of conveying the cathode electrode sheet 111 of a size enabling a plurality of sheets of the cathode electrode layer 110 to be acquired; an anomaly detecting step of detecting anomalies in the cathode electrode sheet 111; a specifying step of specifying a predetermined shape from an area excluding a location in which there is the anomaly detected in the anomaly detecting step; a cutting step of cutting out as the cathode electrode layer 110 of the predetermined shape that was specified in the specifying step; and a bonding step of bonding the cathode electrode layer 110 of the predetermined shape that was cut out to the PEM. For this reason, it is possible to suppress anomalies from being detected in the cathode electrode layer 110 of predetermined shape that was cut out. It is thereby possible to provide a production method of the electrode assembly 100 having improved yield rate.

(2) The anomaly detecting step includes: a first detecting step of detecting anomalies in the entire surface of the cathode electrode sheet 111; and a second detecting step of detecting anomalies in part of an area excluding a location having the anomaly in the first detecting step. For this reason, there is no longer overlapping of the area in which detecting an anomaly in the first detecting step, and area in which detecting an anomaly by way of the second detecting step. It is thereby possible to efficiently detect anomalies of the cathode electrode sheet 111.

(3) The anomaly detecting step has a first detecting step of detecting a surface irregularity 112 in the cathode electrode sheet 111, and a second detecting step of detecting a hole 113 in the electrode sheet in an area excluding the location having the surface irregularity 112 that was detected in the first detecting step. For this reason, there is no longer overlap between the area in which detecting the surface irregularity 112 in the first detecting step, and the area in which detecting the hole 113 by the second detecting step. It is thereby possible to efficiently detect surface irregularities and holes in the cathode electrode sheet 111.

(4) The second detecting step detects anomalies only at an end of the portion to be cut out as the cathode electrode layer 110 of the cathode electrode sheet 111. For this reason, it is possible to avoid anomalies being detected at the end of the portion to be cut out as the cathode electrode layer 110 of the cathode electrode sheet 111. It is thereby possible to both efficiently detect anomalies, and possible to sufficiently improve the yield rate.

(5) The second detecting step is set to higher detection precision than the first detecting step. It is thereby possible to more efficiently detect anomalies in the cathode electrode sheet 111.

According to the electrode bonding apparatus 1 of the present embodiment, the following effects are exerted.

(6) The electrode bonding apparatus 1 of the present embodiment includes: the first conveying device 11 which conveys an electrode sheet of a size enabling a plurality of sheets of at least one electrode layer among the pair of electrode layers to be acquired; the anomaly detection device which detects an anomaly in the cathode electrode sheet 111; the first cutting device 30 which cuts out the cathode electrode layer 110 of a predetermined shape from an area excluding a location having an anomaly detected by the anomaly detection device, from the cathode electrode sheet 111; and the bonding device which bonds the cathode electrode layer 110 of predetermined shape to the PEM. For this reason, it is possible to suppress anomalies from being detected in the cathode electrode layer 110 of predetermined shape that was cut out. It is thereby possible to provide an electrode bonding apparatus of improved yield rate.

(7) The anomaly detection device includes the first detection device 21 which detects surface irregularities 112 in the cathode electrode sheet 111; and the second detection device 22 which detects holes 113 in the cathode electrode sheet 111 in the area excluding locations having surface irregularities 112 detected by the first detection device. For this reason, there will no longer be overlapping of an area in which detecting surface irregularities 112 in the first detecting step and an area in which detecting holes 113 according to the second detecting step. It is thereby possible to efficiently detect surface irregularities 112 and holes 112 in the cathode electrode sheet 111.

(8) The second detection device 22 detects anomalies by moving in a direction (self-traveling direction Y) which is orthogonal to the conveying direction X of the cathode electrode sheet 111. For this reason, anomalies (holes 113) which are in an area that cannot be detected in the case of fixing the second detection device are detected. It is thereby possible to efficiently detect anomalies in the cathode electrode sheet 111 by the second detection device 22.

It should be noted that the present invention can also be applied to electrode structures other than membrane electrode assemblies. More specifically, the electrolyte layer may form by coating the ink of an electrolyte layer rather than of electrolyte membrane onto the electrode layer. At this time, it does not bond, but rather joins by coating the electrolyte layer on the electrode. In other words, not only bonding, but also joining by coating the electrolyte layer onto the electrode is included in the expression of join.

Although an embodiment of the present invention has been explained above, the present invention is not to be limited thereto. For example, an example has been explained in which the first conveying device conveys the cathode electrode of a size which enables a plurality of cathode electrode layers to be acquired; however, the first conveying device may convey an anode electrode of a size which enables a plurality of anode electrode layers to be acquired. In this case, it is possible to suppress anomalies from being detected in the anode electrode layer of a predetermined shape that was cut out.

What is claimed is:

1. An electrode joining method for an electrode assembly of a fuel cell including a pair of electrode layers and an electrolyte layer, the method comprising the steps of:
    conveying an electrode sheet of a size enabling a plurality of sheets of at least one electrode layer among the pair of electrode layers to be acquired;
    detecting an anomaly in the electrode sheet;
    specifying a predetermined shape from an area excluding a location having an anomaly detected in the detecting step;
    cutting out the electrode layer of the predetermined shape specified in the specifying step; and
    joining the electrode layer of the predetermined shape that was cut out to the electrolyte layer.

2. The electrode joining method according to claim 1, wherein the step of detecting an anomaly includes:
    a first detecting step of detecting a surface irregularity in the electrode sheet; and
    a second detecting step of detecting a hole in the electrode sheet in an area excluding a location having a surface irregularity that was detected in the first detecting step.

3. The electrode joining method according to claim 2, wherein:
    the first detecting step detects the surface irregularity in an entire surface of the electrode sheet; and
    the second detecting step detects the hole in part of the area excluding the location having the surface irregularity that was detected in the first detecting step.

4. The electrode joining method according to claim 3, wherein detection precision is set to be higher in the second detecting step than in the first detecting step.

5. An electrode joining apparatus for an electrode assembly of a fuel cell including a pair of electrode layers and an electrolyte layer, the electrode joining apparatus comprising:
    a conveying device which conveys an electrode sheet of a size enabling a plurality of sheets of at least one electrode layer among the pair of electrode layers to be acquired;
    an anomaly detection device which detects an anomaly in the electrode sheet;
    a cutting device which cuts out an electrode layer of a predetermined shape from an area of the electrode sheet excluding a location having an anomaly that was detected by the anomaly detection device; and
    a joining device which joins the electrode layer of predetermined shape to the electrolyte layer.

6. The electrode joining apparatus according to claim 5, wherein the anomaly detection device includes:
    a first detection device which detects a surface irregularity in the electrode sheet; and
    a second detection device which detects a hole in the electrode sheet in an area excluding a location having a surface irregularity that was detected by the first detection device.

7. The electrode joining apparatus according to claim 6, wherein the second detection device detects an anomaly by moving in a direction orthogonal to a conveying direction of the electrode sheet.

8. The electrode joining method according to claim 3, wherein the second detecting step detects an anomaly in only an end of a portion to be cut out as an electrode layer of the electrode sheet.

* * * * *